United States Patent
Hughes et al.

(10) Patent No.: US 11,124,964 B2
(45) Date of Patent: Sep. 21, 2021

(54) MULTIFUNCTIONAL WATER-BORNE HIGH SOLIDS TILE PAINT

(71) Applicant: ARMSTRONG WORLD INDUSTRIES, INC., Lancaster, PA (US)

(72) Inventors: John E. Hughes, Lincoln University, PA (US); Brian L. Springer, Lancaster, PA (US); Michelle X. Wang, Lititz, PA (US); Suzanne M. Huntzinger, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 15/910,176

(22) Filed: Mar. 2, 2018

(65) Prior Publication Data
US 2018/0258638 A1    Sep. 13, 2018

Related U.S. Application Data

(60) Provisional application No. 62/467,853, filed on Mar. 7, 2017.

(51) Int. Cl.
*E04B 9/04*    (2006.01)
*C09D 147/00*    (2006.01)
(Continued)

(52) U.S. Cl.
CPC ............. *E04B 9/045* (2013.01); *B05D 5/02* (2013.01); *C09D 1/00* (2013.01); *C09D 7/45* (2018.01);
(Continued)

(58) Field of Classification Search
CPC . E04B 9/045; E04B 9/241; E04B 9/28; E04B 9/0435; C09D 1/00; C09D 7/70;
(Continued)

(56) References Cited

U.S. PATENT DOCUMENTS 4,559,377 A * 12/1985 Gleason .................. C04B 26/06
                                                524/413
5,869,166 A *  2/1999 Caldwell ............... C08K 3/0008
                                                106/801
(Continued)

OTHER PUBLICATIONS

SpecialChem, "Sodium Polacryaltes/ Polacrylic Acid—Coating Ingredients," https://coatings.specialchem.com/product-categories/additives-dispersing-agents-surfactants-like-sodium-polyacrylates-polyacrylic-acids. (Year: 2019).*

(Continued)

*Primary Examiner* — Michael Zhang
(74) *Attorney, Agent, or Firm* — Craig M. Sterner

(57) ABSTRACT

Described herein is a coated building panel that comprises a side surface that is textured and exhibits a white and/or color. The building panel comprising an upper surface opposite a lower surface and a side surface extending between the upper surface and the lower surface, a coating applied to the side surface, the coating comprising an inorganic particle having a disk shape and an ionic dispersant comprising an ionic group that are present on a repeating unit and the ionic dispersant comprising at least two of the repeating units.

17 Claims, 7 Drawing Sheets

(51) Int. Cl.
| | |
|---|---|
| *C09D 7/61* | (2018.01) |
| *C09D 7/45* | (2018.01) |
| *C09D 7/40* | (2018.01) |
| *C09D 1/00* | (2006.01) |
| *B05D 5/02* | (2006.01) |
| *B05D 1/02* | (2006.01) |
| *B05D 7/00* | (2006.01) |
| *E04B 9/24* | (2006.01) |
| *E04B 9/28* | (2006.01) |

(52) U.S. Cl.
CPC ............... *C09D 7/61* (2018.01); *C09D 7/70* (2018.01); *C09D 147/00* (2013.01); *B05D 1/02* (2013.01); *B05D 7/544* (2013.01); *B05D 2252/00* (2013.01); *B05D 2601/22* (2013.01); *B05D 2601/24* (2013.01); *E04B 9/0435* (2013.01); *E04B 9/241* (2013.01); *E04B 9/28* (2013.01)

(58) Field of Classification Search
CPC .......... C09D 7/45; C09D 7/61; C09D 147/00; B05D 5/02; B05D 2601/24; B05D 2601/22; B05D 2252/00; B05D 7/544; B05D 1/02
See application file for complete search history.

(56) References Cited

U.S. PATENT DOCUMENTS

| | | | |
|---|---|---|---|
| 5,916,392 A | 6/1999 | Ghanbari | |
| 6,087,016 A * | 7/2000 | Feeney | B60C 1/00 |
| | | | 427/245 |
| 6,359,058 B1 * | 3/2002 | Clarke | C09D 7/02 |
| | | | 524/556 |
| 9,051,488 B2 | 6/2015 | Luo et al. | |
| 2007/0110981 A1 * | 5/2007 | Killilea | C04B 41/009 |
| | | | 428/294.7 |
| 2009/0004468 A1 * | 1/2009 | Chen | C04B 41/009 |
| | | | 428/351 |
| 2009/0005494 A1 * | 1/2009 | Luo | C04B 41/009 |
| | | | 524/502 |
| 2012/0107625 A1 * | 5/2012 | Smith | C09D 5/004 |
| | | | 428/447 |
| 2012/0263961 A1 * | 10/2012 | Beaudry | B05D 7/54 |
| | | | 428/463 |
| 2015/0148457 A1 | 5/2015 | Yun et al. | |
| 2015/0330072 A1 * | 11/2015 | Kragness | C03C 25/47 |
| | | | 181/290 |

OTHER PUBLICATIONS

International Search Report from Corresponding Application No. PCT/US2018/020583, dated Jun. 25, 2018. WO.

* cited by examiner

MULTIFUNCTIONAL WATER-BORNE HIGH SOLIDS TILE PAINT

CROSS-REFERENCE TO RELATED APPLICATIONS

This application claims the benefit of U.S. Provisional Application No. 62/467,853, filed on Mar. 7, 2017. The disclosure of the above application is incorporated herein by reference.

BACKGROUND

Ceiling systems are installed into room environments to help control noise as well as enhance the aesthetic appeal of those room environments. These ceiling systems may comprise one or more building panels having specific aesthetic properties that help contribute to the appeal of the room environment. Previous attempts at improving the aesthetic properties of these building panels included applying one or more coatings to a surface of the building panel. These coatings may include a primer coating and/or a textured top-coating. Previously, separate and distinct compositions were needed for each of the primer coatings and textured top-coatings, because a single composition lacked the adaptability needed for the varying aesthetic properties of a primer coating and a textured top-coating. Requiring at least two separate and distinct composition results in longer manufacturing times, additional equipment and storage, as well as greater material costs. Thus there exists a need for a multi-functional coating composition that is suitable for application to a building panel that is capable of addressing the characteristic indicative of both primer and textured top-coatings, thereby overcoming the difficulties with respect to manufacturing while also not sacrificing the required aesthetic properties provided by the desired coatings.

BRIEF SUMMARY

The present invention is directed to a coated building panel comprising a body comprising an upper surface opposite a lower surface and a side surface extending between the upper surface and the lower surface, a coating applied to the side surface, the coating comprising an inorganic particle having a disk shape; and an ionic dispersant comprising an ionic group that are present on a repeating unit and the ionic dispersant comprising at least two of the repeating units.

Other embodiments of the present invention include a coated building panel having a first major surface opposite a second major surface and a side surface extending between the first and second major surfaces, the coated building panel further comprising a body comprising an upper surface opposite a lower surface and a side surface extending between the upper surface and the lower surface, a coating applied to the side surface of the body, the surface coating comprising a first sub-layer applied directly to the side surface of the body, and a second sub-layer applied to the first sub-layer, wherein the first sub-layer and the second sub-layer each comprise a coating composition that includes an inorganic particle having a disk shape and an ionic dispersant comprising at least two ionic groups.

Other embodiments of the present invention include a method of forming a building panel having an edge coating, the method comprising a) providing a body having an upper surface opposite a lower surface and a side surface extending between the upper surface and the lower surface, b) creating a first coating by applying a multi-functional coating composition to the side surface of the body according to a first application parameter, c) creating a second coating by applying the multi-functional coating composition to the first coating according to a second application parameter; and d) drying the multi-functional coating composition for a drying period to form the edge coating, the edge coating having less than about 1 wt. % of the liquid carrier; wherein the multi-functional coating composition comprises a liquid carrier, an inorganic particle having a disk-shape, and an ionic dispersant, the multi-functional coating composition having a solid's content ranging from about 70 wt. % to about 95 wt. % based on the total weight of the multi-functional coating composition; and wherein the first application parameter is different from the second application parameter.

The present invention further includes other embodiments directed to a multi-functional coating composition suitable for coating a building panel, the coating composition comprising an inorganic particle having a disk shape and an ionic dispersant comprising an ionic group that are present on a repeating unit and the ionic dispersant comprising at least two of the repeating units, wherein the coating composition has a solids content ranging from about 70 wt. % to about 95 wt. % based on the total weight of the coating composition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
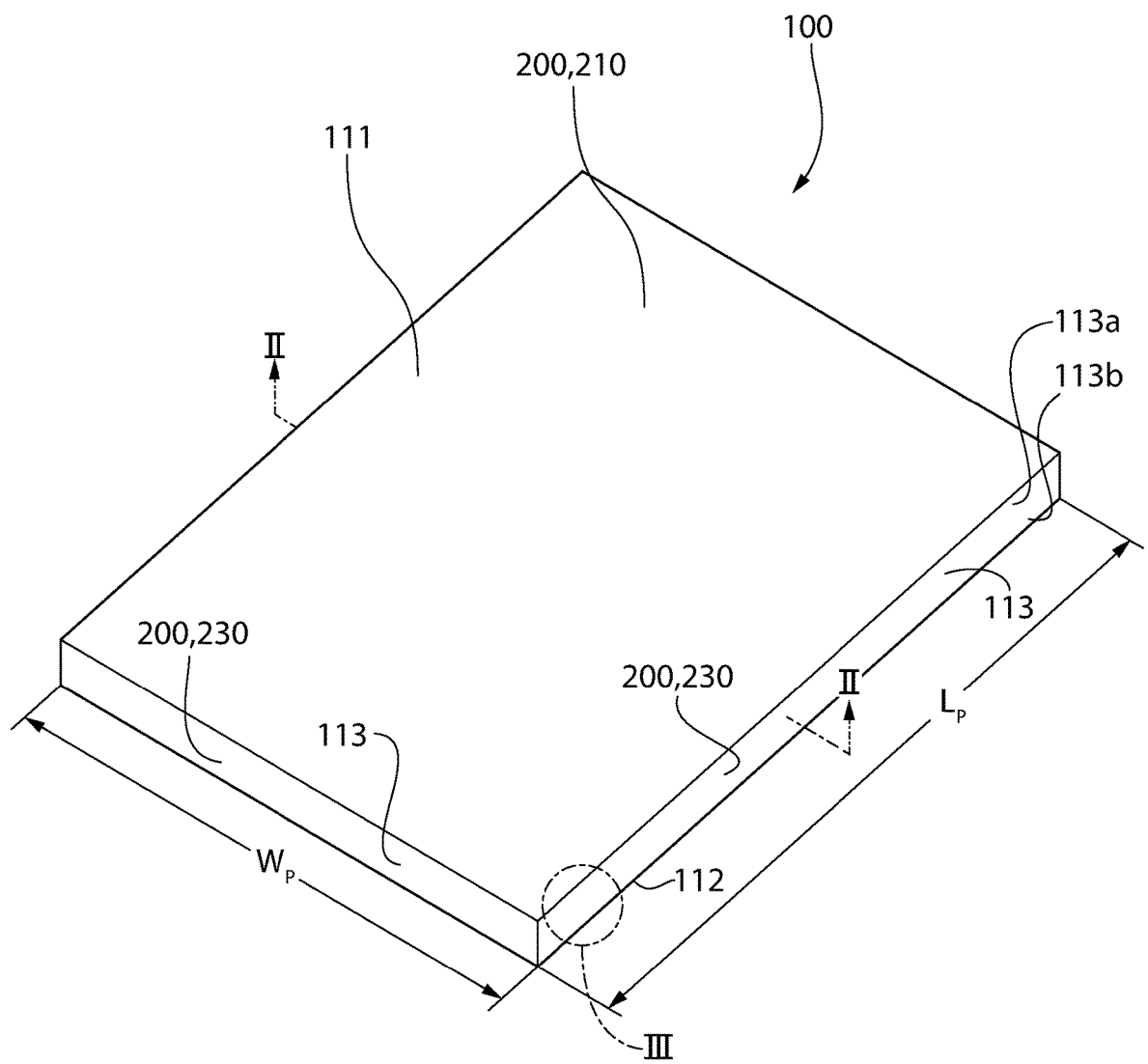
FIG. 1 is top perspective view of a coated building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Referring to FIG. 1, the present invention includes a coated building panel 100 (referred to herein as "building panel") comprising a first major surface 111 opposite a second major surface 112 and a side surface 113 that extends between the first major surface 111 and the second major surface 112, thereby defining a perimeter of the ceiling panel 100. The side surface 113 may comprise an upper portion 113a and a lower portion 113b, wherein the upper portion 113a is adjacent to the first major surface 111 and the lower portion 113b is adjacent to the second major surface 112.

Figure 5:
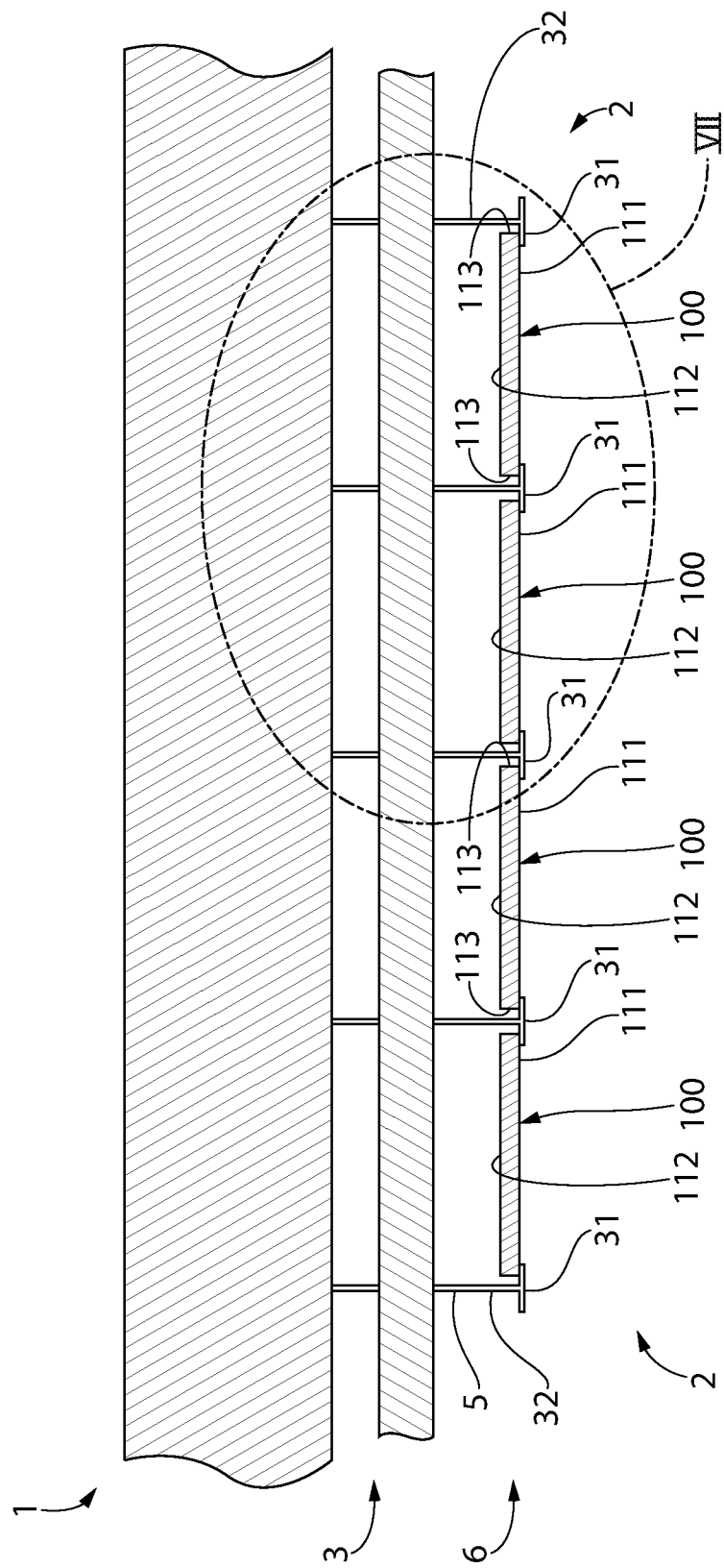
FIG. 5 is a ceiling system comprising the coated building panel of the present invention.

Referring to FIG. 5, the present invention may further include a ceiling system 1 comprising one or more of the building panels 100 installed in an interior space, whereby the interior space comprises a plenum space 3 and an active room environment 2. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 6. The plenum space 3 exists above the ceiling support grid 6 and the active room environment 2 exists below the ceiling support grid 6.

In the installed state, the first major surface 111 of the building panel 100 may face the active room environment 2 and the second major surface 112 of the building panel 100 may face the plenum space 3. The building panel 100 may be installed according to at least two variations. In a first variation, the building panel 100 is positioned entirely above the horizontal flange 31 of the support struts 5. In the first variation, at least a portion of the first major surface may be concealed from the active room environment 2 by the horizontal flange 31 because the horizontal flange 31 contacts the first major surface 111, thereby supporting it in the ceiling system 1. In the first variation, the entire side surface 113—including the upper portion 113a and the lower portion 113b—may be concealed from the active room environment 2 by the horizontal flange 311. The second variation will be described further herein.

Figure 2:
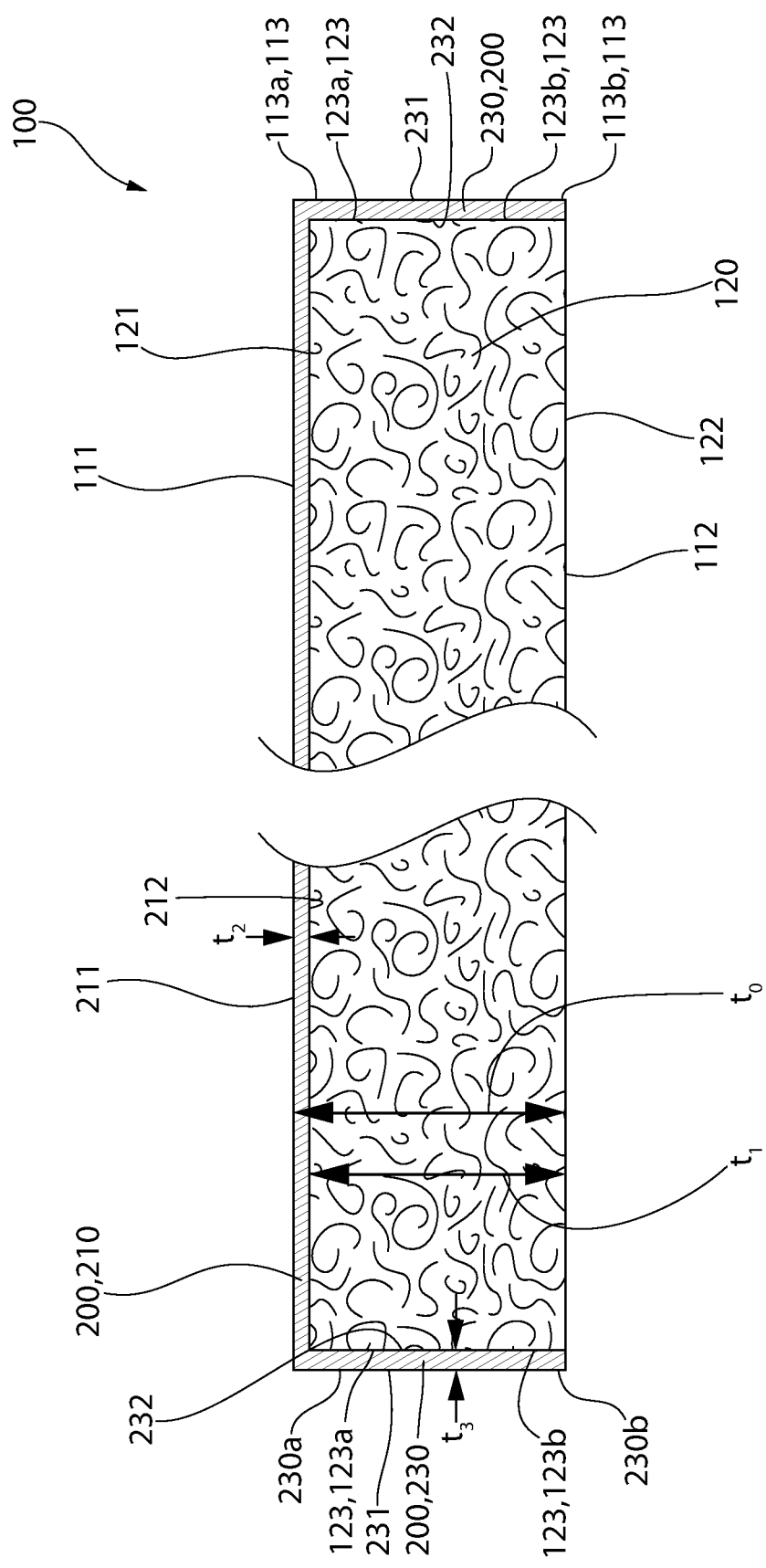
FIG. 2 is a cross-sectional view of the coated building panel according to the present invention, the cross-sectional view being along the II line set forth in FIG. 1.

Referring now to FIGS. 1 and 2, the building panel 100 of the present invention may have a panel thickness $t_0$ as measured from the first major surface 111 to the second major surface 112. The panel thickness $t_0$ may range from about 12 mm to about 40 mm—including all values and sub-ranges there-between. The building panel 100 may have a length $L_P$ ranging from about 30 cm to about 310 cm—including all values and sub-ranges there-between. The building panel 100 may have a width $W_P$ ranging from about 10 cm to about 125 cm—including all values and sub-ranges there-between.

The building panel 100 may comprise a body 120 and a surface coating 200 applied thereto—as discussed further herein. The body 120 comprises an upper surface 121 opposite a lower surface 122 and a body side surface 123 that extends between the upper surface 121 and the lower surface 122, thereby defining a perimeter of the body 120. The body 120 may have a body thickness $t_1$ that extends from the upper surface 121 to the lower surface 122. The body thickness $t_1$ may range from about 12 mm to about 40 mm—including all values and sub-ranges there-between.

The body 120 may be porous, thereby allowing airflow through the body 120 between the upper surface 121 and the lower surface 122—as discussed further herein. The body 120 may be comprised of a binder and fibers. In some embodiments, the body 120 may further comprise a filler and/or additive.

Non-limiting examples of binder may include a starch-based polymer, polyvinyl alcohol (PVOH), a latex, polysaccharide polymers, cellulosic polymers, protein solution polymers, an acrylic polymer, polymaleic anhydride, epoxy resins, or a combination of two or more thereof. Non-limiting examples of filler may include powders of calcium carbonate, limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate.

The fibers may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof.

Referring now to FIG. 2, the building panel 100 may further comprise the surface coating 200 applied to at least one of the first major surface 121 and/or the side surface 123 of the body 120. In some embodiments, the surface coating 200 may include a face coating 210 that is applied to the first major surface 121 of the body 120. In a preferred embodiment, the surface coating 200 may be an edge coating 230 that is applied to the side surface 123 of the body 120. Other embodiments include that the building panel 100 may comprise h the face coating 210 applied to the first major surface 121 of the body 120 as well as the edge coating 230 applied to the side surface 123 of the body 120.

Each of the surface coatings 200 may be substantially continuous. According to the present invention, the term "substantially continuous" refers to less than 5% of the available surface area on the surface underlying the surface coating 200 being visible by the naked eye. For example, for a substantially continuous edge coating 230 that is applied to the side surface 123 of the body 120, less than 5% of the surface area of the side surface 123 of the body 120 is visible when viewing the edge coating 230 with a naked eye.

The face coating 210 may comprise an upper surface 211 opposite a lower surface 212. The face coating 210 has a face coating thickness $t_2$ as measured from the upper surface 211 to the lower surface 212 of the face coating 210. The face coating thickness $t_2$ may range from about 200 μm (micron) to about 500 μm including all thicknesses and sub-ranges there between. The lower surface 212 of the face coating 210 may be in direct contact with the upper surface 121 of the body 120. The upper surface 211 of the face coating 210 may form at least a portion of the first major surface 111 of the building panel 100 as discussed further herein.

The edge coating 230 may comprise an outer surface 231 opposite an inner surface 232. The edge coating 230 has an overall edge coating thickness $t_3$ was measured from the outer surface 231 to the inner surface 232 of the edge coating 210. The edge coating thickness $t_3$ may range from about 500 μm to about 1,200 μm including all thicknesses and sub-ranges there-between. The edge coating 230 (i.e., in the dry-state) may be present in an amount ranging from about 750 g/m$^2$ to about 1,500 g/m$^2$—including all amounts and sub-ranges there-between.

According to the embodiments where the building panel 100 comprises the edge coating 230, the side surface 113 of the building panel 100 may comprise the edge coating 230. Specifically, the side surface 113 of the building panel 100 may comprise the outer surface 231 of the edge coating 230. Thus, the outer surface 231 of the edge coating 230 may form the upper portion 113a and the lower portion 113b of the side surface 113 of the building panel 100. Specifically, the upper portion 113a of the side surface 113 may comprise an upper edge coating portion 231a and the lower portion 113b of the side surface 113 may comprise a lower edge coating portion 231b.

Although not pictured, some embodiments of the present invention include a building panel comprising a surface coating 200 comprising only the edge coating 230. Specifically, the building panel 100 may comprise a first major surface opposite a second major surface and a side surface extending there-between. The side surface 113 of the building panel 100 may comprise the edge coating 230, the first major surface 111 of the building panel 100 may comprise the upper surface 121 of the body 120 and the second major surface 112 of the building panel 100 may comprise the lower surface 122 of the body 120.

The surface coating 200 is a multi-functional coating. According to the present invention, the terms "multi-functional surface coating" and "surface coating" may be used interchangeably. The term "multi-functional coating" refers to a coating formed form a multi-functional coating composition (also referred to as "coating composition") that is applied to one or more surfaces of the body 120. The multi-functional coating composition may exhibit a predetermined viscosity as well as at least two different coating characteristics that are dependent on the application methodology that is used to apply the multi-functional coating composition to the body 120 (e.g., spray application vs roll application, application pressure, application rate). The result is that the multi-functional coating composition can form a variety of different surface coatings 200, each having a different coating characteristics (e.g., surface texture) that is specifically tailored to the type of application methodology used to apply the multi-functional coating composition to the body 120. Having a single coating composition capable of forming a variety of coatings each having a unique coating characteristic provides a user with a dynamic approach to forming a variety of unique coating building panels without needing to switch between multiple separate and distinct coating compositions, thereby improving manufacturing time and cost.

The coating composition that may comprise a binder, a dispersant, and an inorganic particle. The coating composition may further comprise a wetting agent. The coating composition may further comprise a pigment. The coating may further comprise various additives—such as, but not limited to, defoamers, anti-microbial agents, flattening agents (silica), and/or fire retardants.

The binder may be present in an amount ranging from about 1 wt. % to about 50 wt. % based on the total dry-weight of the coating composition including all amounts and sub-ranges there-between. According to the present invention, the phrase "dry-state" indicates a composition that is substantially free of a liquid carrier (e.g., liquid water). Thus, for example, the edge coating 230 in the dry-state may comprise the inorganic particle, the dispersant, the binder, and less than about 0.1 wt. % of liquid carrier based on the total weight of the edge coating 230. In a preferred embodiment, the edge coating 230 in the dry-state has a solid's content of about 100 wt. % based on the total weight of the edge coating 230. Conversely, a composition that is in a "wet-state," which refers to a composition containing various amounts of liquid carrier—as discussed further herein.

In some embodiments, the binder may be present in an amount ranging from about 1 wt. % to about 35 wt. % based on the total dry-weight of the coating composition—including all amounts and sub-ranges there-between. Other embodiments provide that the binder may be present in an amount ranging from about 10 wt. % to about 35 wt. % based on the total dry-weight of the coating composition—including all amounts and sub-ranges there-between. Other embodiments provide that the binder may be present in an amount ranging from about 15 wt. % to about 35 wt. % based on the total dry-weight of the coating composition including all amounts and sub-ranges there-between.

Non-limiting examples of the binder include polymers selected from polyvinyl alcohol (PVOH), latex, an acrylic polymer, polymaleic anhydride, or a combination of two or more thereof. Non-limiting examples of latex binder may include a homopolymer or copolymer formed from the following monomers: vinyl acetate (i.e., polyvinyl acetate), vinyl propinoate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, and an ester. Preferably the binder is selected from the group consisting of aqueous lattices of polyvinyl acetate (PVA), polyvinyl alcohol (PVOH), polyvinyl acrylic, polyurethane, polyurethane acrylic, polystyrene acrylic, epoxy, polyethylene vinyl chloride, polyvinylidene chloride, and polyvinyl chloride.

The dispersant may be present in an amount ranging from about 0.01 wt, % to about 2.0 wt. % based on the total dry-weight of the coating composition including all wt. % and sub-ranges there-between. In a prefer embodiment, the dispersant may be present in an amount ranging from about 0.05 wt. % to about 2.0 wt. % based on the total dry-weight of the coating composition including all wt. % and sub-ranges there-between.

The dispersant may comprise a hydrophilic portion and a hydrophobic portion. The dispersant may be ionic in nature—i.e., comprise one or more ionic groups such as anionic group or cationic group. In a preferred embodiment, the ionic group is anionic.

The dispersant of the present invention is a non-polymeric dispersant. The term "non-polymeric dispersant" does not refer to a composition being free of polymeric units. Rather, the term "non-polymer dispersant" refers to the distribution of ionic moieties within the dispersant. Non-polymeric dispersants may comprise polymeric backbones so long as the ionic moiety follows the distribution along that polymeric backbone, as described herein. Specifically, a "non-polymeric dispersant" refers to a dispersant having ionic moieties directly attached to and are located on a repeating unit along a linear polymer backbone as compared to a "polymeric dispersant," which refers to a dispersant having ionic moieties that are indirectly attached to a repeating unit of a linear polymer backbone by a pendant side-chain. Stated otherwise, polymeric dispersants are separated from the linear backbone of a polymer by a pendant side-chain, where non-polymeric dispersants are attached directly to the linear backbone of the polymer and form part of a repeating unit of that linear polymer backbone.

The dispersant may be an anionic polyelectrolyte having negatively charged carboxylic groups. Non-limiting examples of anionic polyelectrolyte dispersants include anionic polyacrylic polymer having a salt group formed from a neutralization of an acid group, such as a carboxylic acid group, with a cation forming compound, such as sodium. A non-limiting example of the non-polymeric dispersant includes sodium polyacrylate comprising a linear polymeric backbone according to Formula

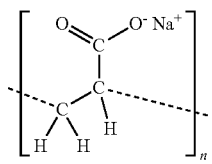

Formula I

Whereby n is a non-zero repeating integer greater than 1. In some embodiments, n has a value of at least 2, preferably at least 3. Specifically n may range from about 2 to about 1,000—including all integers and sub-ranges there-between. The ionic moiety of Formula I forms a portion of the repeating unit of the polymeric backbone. The repeating unit of Formula I may be derived from acrylic acid, whereby addition polymerization of the double bond forms the acrylic acid into a repeating unit comprising an anionic forming group (i.e., carboxylate) forming part of the repeating unit.

The dispersant of the present invention is not limited to anionic moieties of carboxylic acid that is neutralized with sodium. Other non-limiting examples include ionic groups based on phosphoric acids, sulfonic acid, and combinations thereof—in combination with other neutralization agents. Non-limiting examples of neutralization agents other than sodium include potassium, lithium, and ammonium.

The coating composition may further comprise an inorganic particle. The inorganic particle of the present invention has a disk shape (also referred to as "plate shape"). The term "disk shape" refers to a three-dimensional shape, whereby the shape has an aspect ratio ranging from about greater than 1 to 1 ranging to about 1,000 to 1—including all ratios and sub-ranges there-between. The term "aspect-ratio" refers to the ratio of particle diameter (or length, or width) compared to particle thickness. While the ultimate shape of each particle may vary, high aspect ratios—e.g.; about 50 to 1—result in discrete thin plate-like particles having a substantially flat major surface and a relatively short side surface.

The inorganic particles having a disk shape according to the present invention may alternatively refers to a three-dimensional shape, whereby the shape exhibits a major surface having an area per unit of weight (m²/g) that ranges from about 5 m²/g to about 9 m²/g—including all values and sub-ranges there-between. In some embodiments, the disk shape may have a major surface with an area per unit of weight of about 7 m²/g.

The inorganic particles having the disk shape may be comprised of one or more of kaolin, aluminum silicates, kaolinite, aluminum hydroxide, aluminum oxide, and combinations thereof. In a preferred embodiment, the inorganic particles are comprised of kaolin. The inorganic particles having the disk shape may have an average diameter ranging from about 1 micron (μm) to about 10 μm—including all integers and sub-ranges there-between. In one embodiment, the inorganic particles having the disk shape may have an average diameter of about 4 μm.

The inorganic particle having the disk shape may be present in the coating composition in an amount ranging from about 0.5 wt. % to about 10.0 wt. %—including all amounts and sub-ranges there-between—based on the dry weight of the coating composition. In some embodiments, the inorganic particle having the disk shape may be present in the coating composition in an amount ranging from about 1.0 wt. % to about 5.0 wt. %—including all amounts and sub-ranges there-between—based on the dry weight of the coating composition.

The coating composition may further comprise a wetting agent. The wetting agent is a type of surfactant that lowers the surface tension between two liquids or between a liquid and a solid. The wetting agent may comprise a hydrophobic portion and a hydrophilic portion. The hydrophobic portion may be a long aliphatic chain derived from a fatty alcohol. In other embodiments, the hydrophobic portion may comprise one or more aromatic groups. The wetting agent may be non-ionic, whereby the hydrophilic portion includes an ethoxylated chain. In a preferred embodiment, the wetting agent is non-ionic, whereby the hydrophobic portion comprises at least one aromatic group. The wetting agent may comprise two or more aromatic groups. Non-limiting examples of wetting agent include three aromatic groups, such as tristyrylphenol ethoxylate.

The coating composition may further comprise one or more color pigments, thereby resulting in the surface coating 200 exhibiting a color on the visible color spectrum—i.e., violet, blue, green, yellow, orange, or red. The coating composition may also comprise pigments that result in the surface coating 200 having a color of white, black, or grey. The color of the surface coating 200 may also be the result of the coating composition comprising a combinations of two or more colored pigments—such a primary color (i.e., red, yellow, blue) as well as an achromatic color (i.e., white, grey).

The pigment may be an inorganic pigment. Non-limiting examples of inorganic pigment include particles of carbon black, graphite, graphene, copper oxide, iron oxide, zinc oxide, calcium carbonate, manganese oxide, titanium dioxide and combinations thereof. The inorganic pigments may include individual particles having colors selected from, but not limited to, red, blue, yellow, black, green, brown, violet, white, grey and combinations thereof. The particles that make up the first pigment may have a particle size ranging from about 0.1 μm to about 500 μm—including all sizes and sub-ranges there-between. According to some embodiments, the pigment may include a white pigment (e.g., titanium dioxide, calcium carbonate) having a particle size ranging from about 0.5 μm to about 50 μm. A non-limiting example of white pigment includes titanium dioxide having a particle size of about 0.5 μm. Another non-limiting example of white pigment includes calcium carbonate having a particle size of about 45 μm.

The pigment may be present in an amount ranging from about 1 wt. % to about 80 wt. % based on the total dry-weight of the coating composition—including all wt. % and sub-ranges there-between. In some embodiments, the pigment may be present in an amount ranging from about 25 wt. % to about 55 wt. % based on the total dry-weight of the coating composition—including all wt. % and sub-ranges there-between.

Previously, using such pigments to create face coatings required the face coatings to be applied using large amounts of carrier (i.e., low solids content during application of the coatings) and/or large amounts of other additives because such pigments will easily aggregate, thereby forming clumps that result in undesirable aesthetic properties in the resulting face coating. According to the present invention, however, face coatings using such pigments may be formed using high-solid's contents without risk of aggregating—as described further herein.

The coating composition of the present invention has a high-solid's content. The phrase "high solids content" refers to a solids content of at least 45 wt. % based on the total weight of the coating composition. Stated otherwise, the liquid carrier is present in a maximum amount of about 55 wt. % based on the total weight of the face coating composition.

The solid's content is calculated as the fraction of materials present in the coating composition that are not the liquid carrier in the wet-state. Specifically, the solid's content of the coating composition in the wet-state may be calculated as the amount of binder, wetting agent, dispersant, inorganic particle, and pigment as well as other solid additives in the coating composition and dividing it by the total weight of the coating composition (including liquid carrier).

Therefore, the amount of each component in the coating composition may be calculated by multiplying the desired amount of each of the binder, dispersant, wetting agent, inorganic particle, first pigment, and other additives that are present in the surface coating 200 in the dry-state by the total solids content of the face coating composition. For example, for an edge coating 230 in the dry-state comprising about 40 wt. % of pigment and the edge coating 230 was formed from a coating composition having a solids content of 90%—the amount of the pigment in the coating composition would be 36 wt. % based on the total weight of the face coating composition in the wet-state—i.e., 40 wt. %×0.9=36 wt. % of pigment in the wet-sate edge coating composition.

The surface coating 200 may be formed by applying the coating composition a surface 121, 123 of the body 120, whereby the coating composition is in the wet-state and has a solids content ranging from about 70 wt. % to about 95 wt. %—including all percentages and sub-ranges there-between. In a preferred embodiment, the coating composition in the wet-state is applied to the side surface 123 of the body 120 at a solid's content ranging from about 80 wt. % to about 95 wt. %—including all percentages and sub-ranges there-between. Alternatively the coating composition may comprise liquid carrier in an amount ranging from about 8 wt. % to about 20 wt. %—based on the total weight of the coating composition in the wet-state including all percentages and sub-ranges there-between.

The coating composition in the wet-state may have a viscosity ranging from about 7,000 cps to about 18,000 cps as measured by a Brookfield viscometer at 10 RPM using a #4 spindle at room temperature—including all viscosities and sub-ranges there-between. The coating composition in the wet-state may comprise water as the liquid carrier, wherein the liquid carrier comprises less than 1 wt. % of VOC solvent.

Generally, the coating composition in the wet-state may be applied to the side surface 123 of the body in an amount ranging from about 1,000 g/m$^2$ to about 2,000 g/m$^2$—including all sub-ranges and values there-between.

The coating composition may be dried at an elevated temperature for a drying period—wherein the elevated temperature ranges from about 120° C. to about 240° C.—including all sub-ranges and temperature there-between. The drying period may range from about 10 seconds to about 120 seconds—including all sub-ranges and temperature there-between. The resulting edge coating 230 (i.e., in the dry-state) may be present in an amount ranging from about 750 g/m$^2$ to about 1,500 g/m$^2$—including all amounts and sub-ranges there-between.

Figure 3:
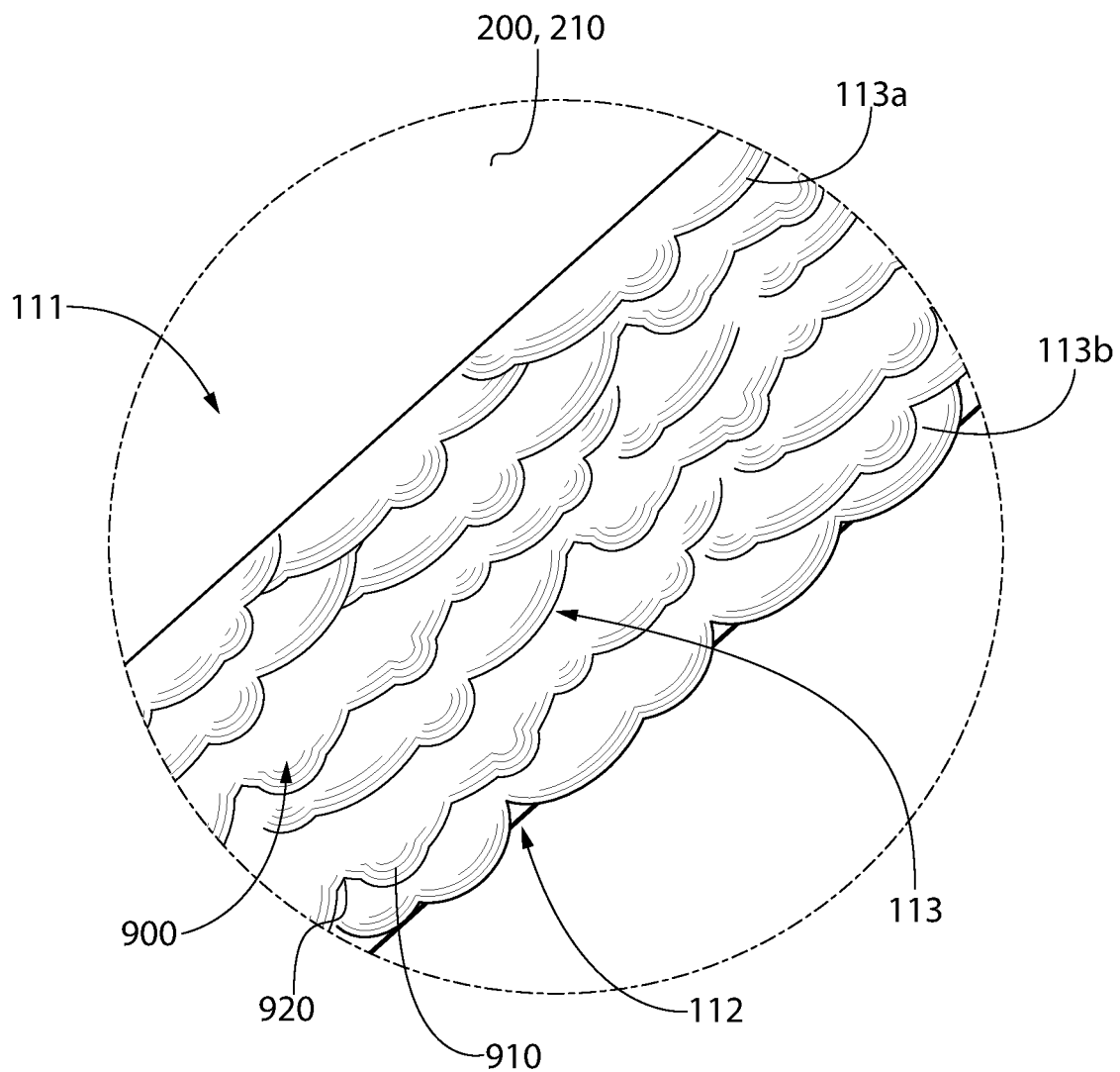
FIG. 3 is a close-up view of a side surface of the building panel according to the present invention, the close-up view being the area highlighted by III set forth in FIG. 1.
Figure 4:
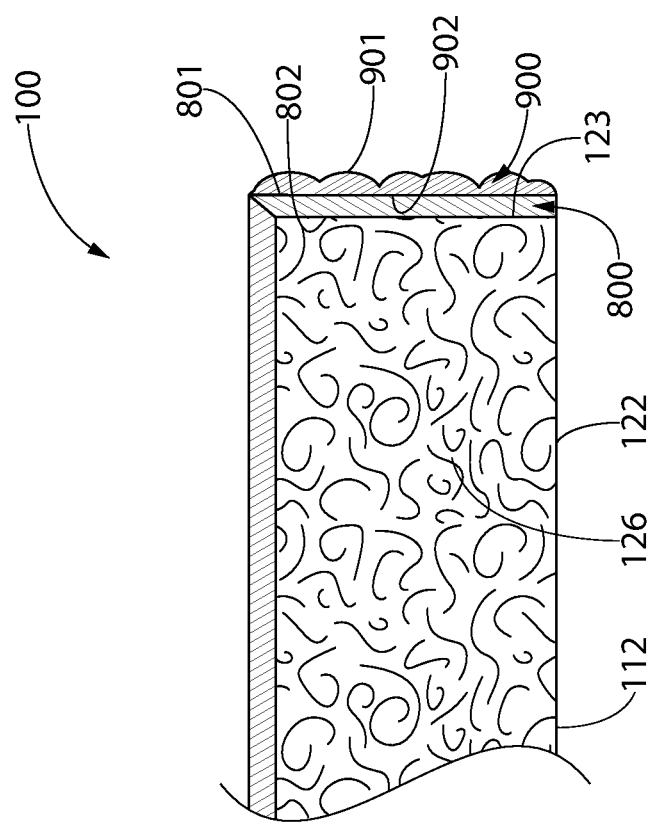
FIG. 4 is a cross-sectional view of the coated building panel according to another embodiment of the present invention, the cross-sectional view being along the II line set forth in FIG. 1.
Figure 4:
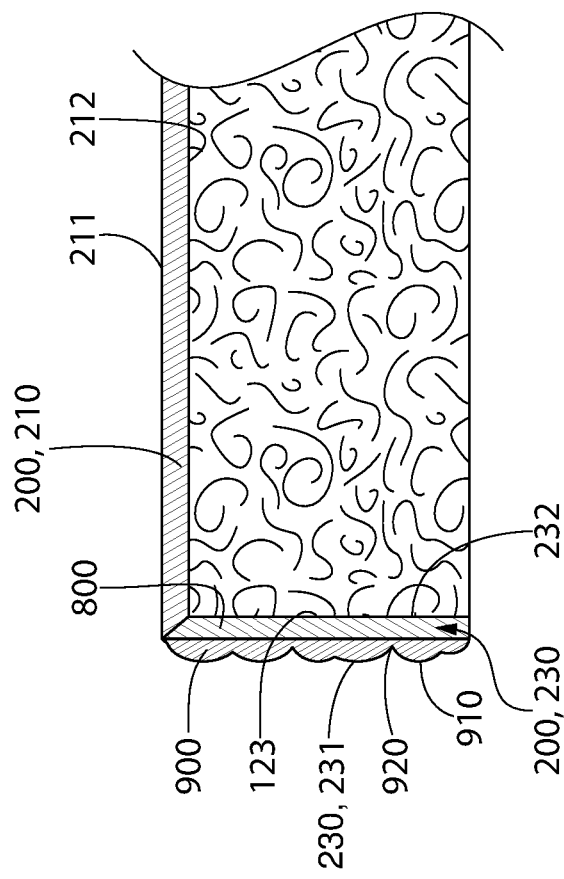

Referring now to FIGS. 3 and 4, the edge coating 230 of the present invention may comprise two or more sub-layers. Specifically, the edge coating 230 may comprise a first sub-layer 800 having a first surface 801 that is opposite a second surface 802. The first sub-layer 800 may also be preferred to as a "primer" layer. The edge coating may further comprise a second sub-layer 900 having a first surface 901 that is opposite a second surface 902. The second sub-layer 900 may also be preferred to as a "topcoat" layer. Although not pictured, additional sub-layers may be present in the edge coating 230.

The first sub-layer 800 of the present invention and be formed by applying the coating composition of the present invention in the wet-state to the side surface 123 of the body 120 according to a first application parameter. The second sub-layer 900 may then be formed by applying the same the coating composition in the wet-state to the first sub-layer 800 according to a second application parameter. The first and second application parameters may be the same or may be different. Non-limiting examples of the first and second application parameter include application methodology— such as spray application versus roll application; application rate; application pressure; and/or application temperature. In a non-limiting example, the first application parameter may include an atomization pressure of about 40 psi to about 60 psi—preferably about 50 psi. In a non-limiting example, the second application parameter may include an atomization pressure of about 15 psi to about 25 psi—preferably about 20 psi.

The coating composition forming the first sub-layer 800 may be dried prior to application of the coating composition that forms the second sub-layer 900. Alternatively, the coating composition of the first sub-layer 800 and the second sub-layer 900 may be dried concurrently.

The resulting edge coating 230 includes the second surface 802 of the first sub-layer 800 facing the side surface 123 of the body 120, and the side surface of the building panel 100 comprising the first surface 901 of the second sub-layer 900. Under this configuration the first surface 801 of the first sub-layer 800 faces the second surface 902 of the second sub-layer 900. Each of the first and second sub-layers 800, 900 may independently be substantially continuous.

The first sub-layer 800 may have a first sub-layer thickness as measured between the first and second surfaces 801, 802 of the first sub-layer 800. The second sub-layer 900 may have a second sub-layer thickness as measured between the first and second surfaces 901, 902 of the second sub-layer. According to some embodiments, the second sub-layer thickness may be greater than the first sub-layer thickness. The ratio of the second sub-layer thickness to the first sub-layer thickness may range from about 2:1 to about 4:1—including all ratios and sub-ranges there-between.

In a non-limiting example, applying the multi-functional coating composition using the first application parameter may results in the first sub-layer 800 being smooth as the coating characteristic. The term "smooth" refers to the first sub-layer 800 having a substantially uniform thickness— i.e., a change in thickness between the first and second surfaces 801, 802 that is less than 15% across the first sub-layer 800. Applying the multi-functional coating composition using the second application parameter may result in the second sub-layer 900 having a varied macroscopic surface topography as the coating characteristic. The phrase "varied macroscopic surface topography" refers to a surface texture comprising a plurality of peaks 910 and valleys 920 that are visible to the naked eye. The plurality of peaks 910 and valleys 920 provide a "pop-corned" appearance to the surface coating 200 of the building panel 100, whereby a height differential between the peaks 910 and the valleys 920 may be as great as about 150 µm. The average distance between adjacent peaks 910 on the second surface 902 may range from about 1.0 mm to about 3.0 mm—including all distances and sub-ranges there-between.

The coating characteristic of each the first and second sub-layers may vary depending on the first and second application parameter selected. However, creating a first and second sub-layer 800, 900 having different coating characteristics from a single coating composition is the result of the multi-functional coating composition according to the present invention.

Although not shown, the building panel 100 of the present invention may further comprise a non-woven scrim. The non-woven scrim may comprise an upper surface opposite a lower surface. The lower surface of the non-woven scrim may be positioned immediately adjacent to and in direct contact with the upper surface 121 of the body 120. The face coating 210 may be applied to the non-woven scrim such that the lower surface 212 of the face coating 210 is in direct contact with the upper surface of the non-woven scrim.

Figure 6:
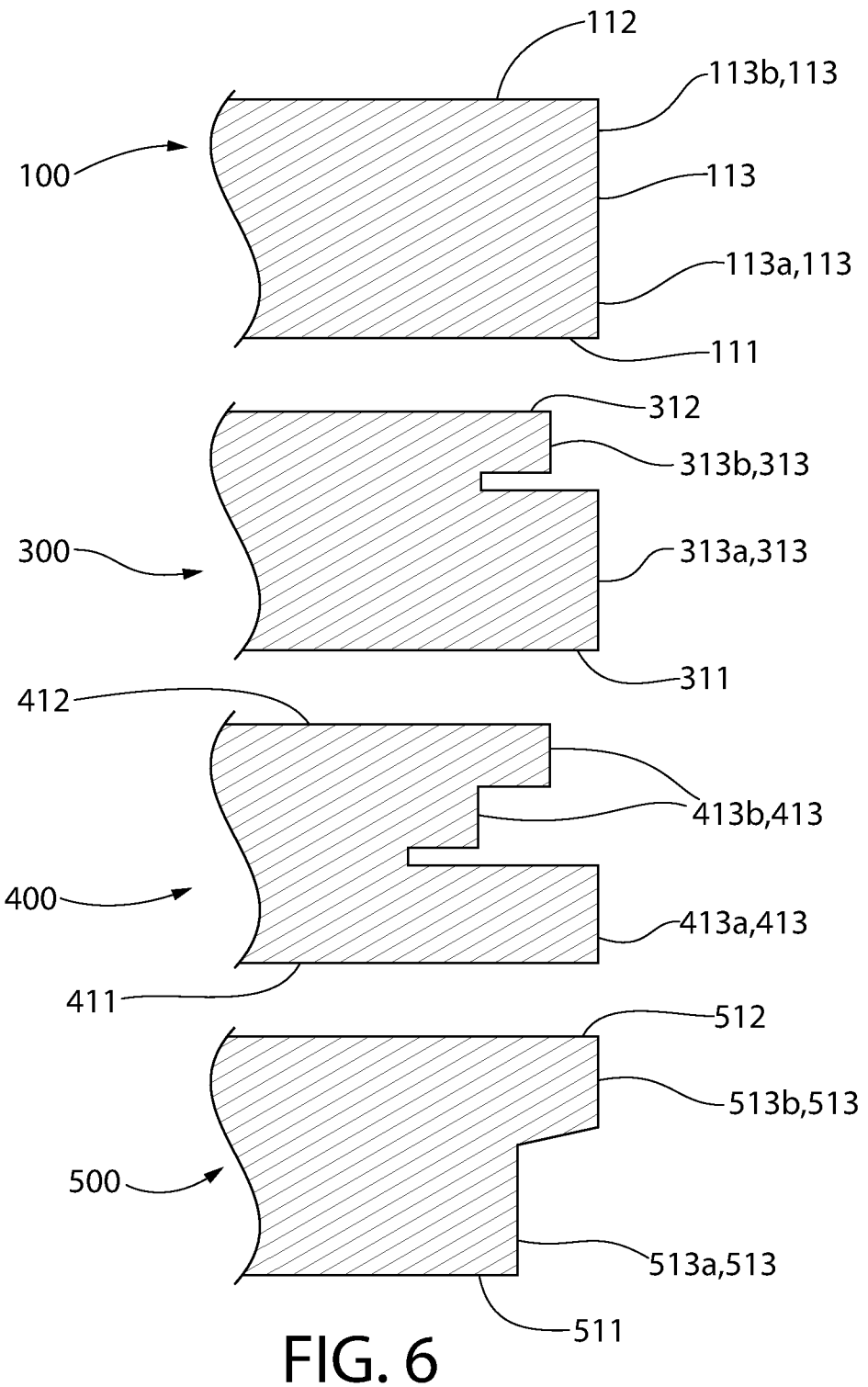
FIG. 6 is a cross-sectional close-up view of the edges of the building panels according to the present invention.

Referring now to FIG. 6, building panels 300, 400, 500 are illustrated in accordance with other embodiments of the present invention. The building panels 300, 400, and 500 are similar to building panel 100 except as described herein below. The description of building panel 100 above generally applies to building panels 300, 400, and 500 described below except with regard to the differences specifically noted below. A similar numbering scheme will be used for the building panels 300, 400, and 500 as with building panel 100 except that the 300-, 400-, and 500-series of numbers will be used.

Figure 7:
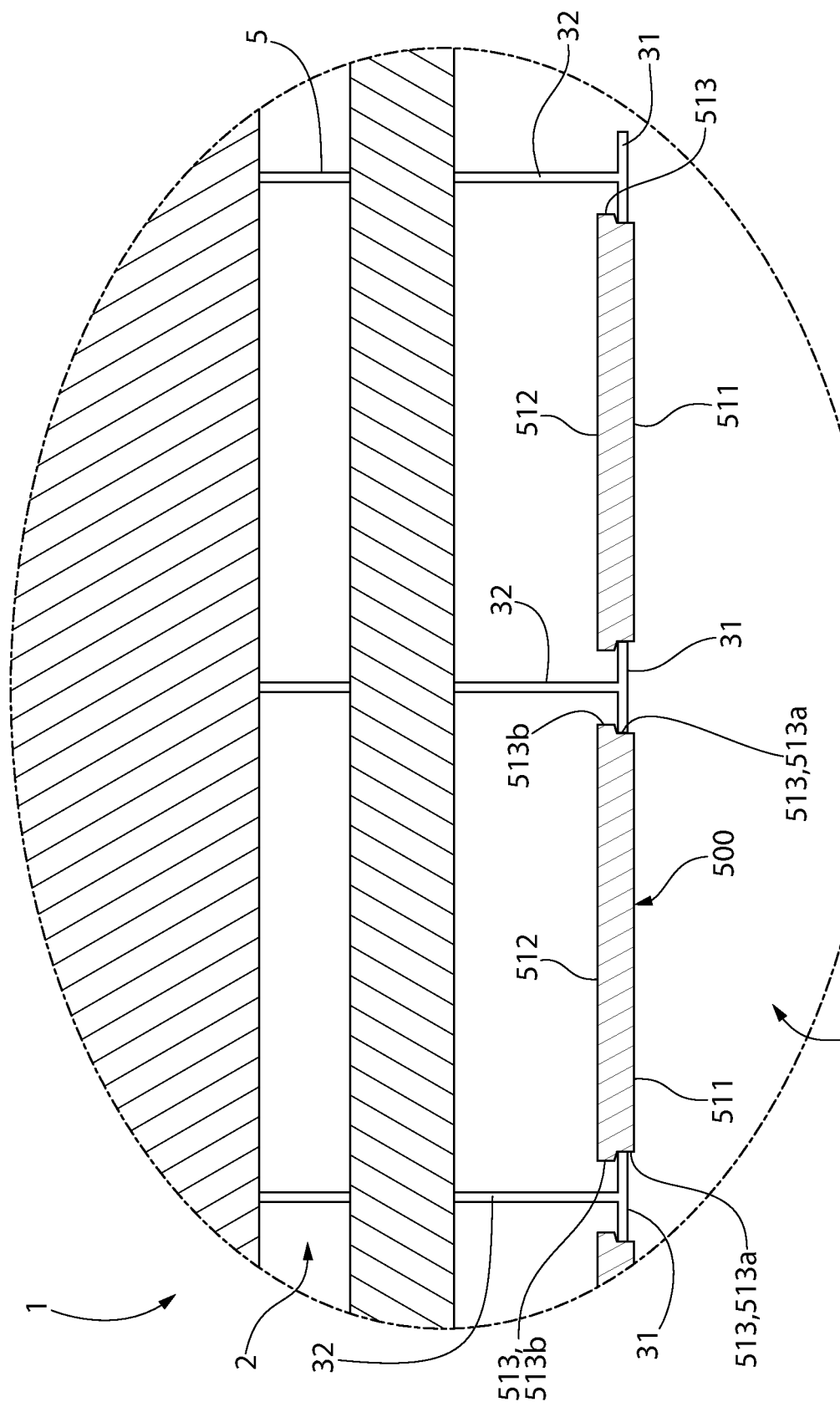
FIG. 7 is a close-up view of a ceiling system comprising the coated building panel according to an alternative embodiment of the present invention, the close-up view being the portion identified by oval VII in FIG. 5.

Referring now to FIGS. 5 and 7, the building panel 500 may be installed according to the second variation, as described herein. The building panel 500 may be positioned such that the upper portion 513a of the side surface 513 is below the horizontal flange 31, thereby extending into the active room environment 2. In the second variation, the lower portion 513b of the side surface 513 is above the horizontal flange 31 extending into the plenum space 3. In the second variation, the first major surface 511 and the upper portion 513a of the side surface 513 of the building panel 500 is exposed to the active room environment 2. In the second variation, the lower portion 513b of the side surface 513 may be concealed from the active room environment 2. The lower portion 513b of the side surface 513 may be adjacent to at least a portion of the vertical web 32 as viewed along a horizontal direction. The lower portion 513b of the side surface 513 as well as the second major surface 512 may be exposed to the plenum space 3.

According to these embodiments, the upper portion 513a and the lower portion 513b may comprise the surface coating 200—specifically, the first face coating 210. According to these embodiments, the first major surface 511 may comprise the surface coating 200—specifically, the edge coating 230. Therefore, the surface coating 200 may be exposed to the active room environment on the first major surface 511 and the upper portion 513a of the side surface 513 of the building panel 500 in the installed state.

The invention will be described in greater detail by way of specific examples. The following examples are offered for illustrative purposes and are not intended to limit the invention in any manner.

EXAMPLES

The following experiment is directed to a multi-functional coating composition of the present invention. Coating compositions were prepared according to the following formulations set forth in Table 1:

Dispersant 1: anionic dispersant whereby the ionic groups are pendant off a linear polymer backbone—i.e., not present on repeating groups that form the linear backbone of the polymer Dispersant 2: sodium polyacrylate—i.e., anionic dispersant, whereby the ionic groups are present directly on repeating units that form at least a portion of the linear backbone of the polymer Wetting Agent 1: aliphatic ethoxylated fatty alcohol—i.e., non-ionic and non-aromatic Wetting Agent 2: tristyrylphenol ethoxylate—i.e., aromatic and non-ionic Inorganic Particle w/High Aspect Ratio—Kaolin having an average particle size of about 4 μm at 7 m²/g Pigment: $TiO_2$ and $CaCO_3$ blend Binder 1: carboxylated polyvinyl acetate homopolymer having 50% solids, 7 pH, and Tg of 37° C.

Binder 2: vinyl acrylic latex having a 55% solids, 5 pH, and Tg of 19° C.

Defoamer: organo-modified polysiloxane

Anti-Microbial Agent: 3,5-dimethyltetrahydro-1,3,5-thiadiazine-2-thione

Fire Retardant: aluminum trihydrate

Rheology modifier: alkali-swellable emulsion comprising magnesium aluminosilicate Each example was prepared by blended together components. The viscosity of each sample was then measured using a Brookfield viscometer at 10 RPMs. As demonstrated by Table 1, the combination of a non-polymeric dispersant and high-aspect ratio inorganic particle imparts the desired viscosity needed for each coating composition to exhibit the requisite multi-functional characteristics to form a coating having a variety of unique coating characteristics that can be readily tailored based on application parameter.

Additionally, each composition was applied to the edge of a fibrous body by spray gun at a first atomization pressure of about 50 psi. The first atomization pressure is used in the formation of primer layers. Each composition was also applied to the edge of a fibrous body by spray gun at a second atomization pressure of about 20 psi. The second atomization pressure is used in the formation of topcoat layers having a pop-corned texture. The goal of the experiment was to determine the multi-functional nature of the coating compositions.

The Table 1 demonstrates each coating composition's ability to form a multifunctional coating. Specifically, a pass ("P") refers to a single composition being capable of forming both (1) a primer layer of the requisite application texture and thickness, and (2) a pop-corned topcoat layer having the requisite application texture and thickness. Conversely, a fail ("F") refers to the single composition failing to form at least one of the (1) primer layer and/or (2) pop-corned topcoat layer by not adhering to the edge of the body, having excessive run-off or dripping of the coating composition, and/or not providing the textured nature necessary for the pop-corned appearance.

TABLE 1

| Wt. % | Comp Ex. 1 | Comp Ex. 2 | Comp Ex. 3 | Comp Ex. 4 | Comp Ex. 5 | Ex. 1 | Ex. 2 | Ex. 3 | Ex. 4 | Ex. 5 | Ex. 6 | Ex. 7 |
|---|---|---|---|---|---|---|---|---|---|---|---|---|
| Water | 9.2 | 9.2 | 9.1 | 13.6 | 13.5 | 10.4 | 11.6 | 17.8 | 11.3 | 11.2 | 11.1 | 11.1 |
| Pigment | 40.7 | 40.7 | 40.7 | 40.0 | 39.0 | 32.3 | 32.4 | 36.3 | 32.4 | 32.4 | 32.4 | 32.4 |
| Dispersant 1 | 1.0 | 1.0 | 1.0 | 1.5 | 1.0 | — | — | — | — | — | — | — |
| Dispersant 2 | — | — | — | — | — | 0.5 | 0.5 | 1.5 | 0.8 | 0.8 | 0.5 | 0.5 |
| Wetting Agent 1 | 0.5 | 0.5 | 0.5 | 0.6 | 0.5 | — | — | — | — | — | — | — |
| Wetting Agent 2 | — | — | — | — | — | 0.7 | 0.7 | 0.7 | 0.7 | 0.8 | 0.7 | 0.7 |
| Binder 1 | 21.1 | | 21.1 | | 10.5 | | | | | | | |
| Binder 2 | | 21.1 | | 20.7 | 10.5 | 30.3 | 30.4 | 20.0 | 30.4 | 30.4 | 30.4 | 30.4 |
| Inorganic Particle w/ High Aspect Ratio | 4.0 | 4.0 | 4.0 | 2.0 | 4.0 | 3.5 | 2.0 | 2.7 | 2.0 | 2.0 | 2.5 | 2.5 |
| Rheology Modifier | 0.5 | 0.5 | 0.5 | 0.6 | 0.5 | 0.2 | 0.2 | 0.3 | 0.2 | 0.2 | 0.2 | 0.2 |
| Defoamer | 0.8 | 0.8 | 0.8 | 0.8 | 0.8 | 0.8 | 0.8 | 0.8 | 0.8 | 0.8 | 0.8 | 0.8 |
| Silica | 5.0 | 5.0 | 5.0 | 3.0 | 4.0 | 4.5 | 4.5 | 4.5 | 4.5 | 4.5 | 4.5 | 4.5 |
| Hydroxyethyl Cellulose | 0.1 | 0.1 | 0.2 | 0.4 | 0.5 | 0.2 | 0.2 | 0.1 | 0.2 | 0.2 | 0.2 | 0.2 |
| Anti-Microbial Agent | 0.1 | 0.1 | 0.1 | 0.1 | 0.1 | 0.1 | 0.1 | 0.1 | 0.1 | 0.1 | 0.1 | 0.1 |
| Fire Retardant | 17.0 | 17.0 | 17.0 | 16.7 | 15.0 | 16.5 | 16.6 | 15.2 | 16.4 | 16.6 | 16.6 | 16.6 |
| Total | 100 | 100 | 100 | 100 | 100 | 100 | 100 | 100 | 100 | 100 | 100 | 100 |
| Viscosity (cps) @ 10 RPM | 8,200 | 3,950 | 23,520 | 4,960 | 7,480 | 10,480 | 7,680 | 10,360 | 12,200 | 16,240 | 12,520 | 15,360 |
| Pass/Fail of Multifunctional Coating Performance | F | F | F | F | F | Y | Y | Y | Y | Y | Y | Y |

As demonstrated by Table 1, the combination of the dispersant of the present invention and inorganic particles surprisingly resulted in a coating composition having multifunctional nature capable forming both primer and topcoat layers while polymeric dispersants fail to result in a multifunctional coating composition.

Additionally, it has been surprisingly discovered that the combination of dispersant and inorganic particles of the present invention provide greater control and predictability in viscosity of the coating composition—as demonstrated by Table 2 herein.

TABLE 2

|  | Comp. Ex. 1-4 | Ex. 1-7 |
|---|---|---|
| Average Viscosity (cps) | 9,622 | 12,120 |
| Standard Deviation | 7,963 | 2,975 |

Using comparable amounts of dispersant, wetting agent, rheology modifier, and hydroxyl ethyl cellulose (acting as a gelling agent), the inventive compositions of examples 1-7 provide an unexpected improvement in control over viscosity. The surprising improvement in viscosity control is demonstrated by the standard deviation of the inventive compositions of Examples 1-7 being almost three times smaller than the standard deviation of the comparative compositions of Comparative Examples 1-4, even though the average viscosity of Examples 1-7 is greater than the average viscosity of Comparative Examples 1-4. The unexpected improvement in viscosity control provides for greater flexibility in formulation variations for variation components, such as (but not limited to) wetting agent, rheology modifier, and/or hydroxyl ethyl cellulose—while still allowing the overall coating composition to remain within an acceptable window of viscosity ranges. As compared to the comparative compositions that may undergo slight changes in composition that exhibit large variations in viscosity. For example, in Comparative Example 3 there is a slight increase in hydroxyl ethyl cellulose relative to Comparative Example 1, whereby about the same water content is used, yet there is a large change in viscosity not demonstrated by any of the inventive examples.

As those skilled in the art will appreciate, numerous changes and modifications may be made to the embodiments described herein, without departing from the spirit of the invention. It is intended that all such variations fall within the scope of the invention.

What is claimed is:

1. A coated building panel comprising:
   a body comprising an upper surface opposite a lower surface and a side surface extending between the upper surface and the lower surface;
   a coating applied to the side surface of the body, the coating comprising:
     an inorganic particle having a disk shape; and
     an ionic dispersant comprising an ionic group that are present on a repeating unit and the ionic dispersant comprising at least two of the repeating units; and
     a non-ionic and aromatic wetting agent;
   wherein the coating has a thickness ranging from about 500 microns to about 1,200 microns;
   wherein the inorganic particle comprises kaolin having an average particle size of about 1 µm to about 10 µm; and
   wherein the repeating units form a linear backbone of a polymer and the wetting agent is tristyrylphenol ethoxylate.

2. The coated building panel according to claim 1, wherein the ionic dispersant is present in an amount ranging from about 0.05 wt. % to about 2.0 wt. % based on the total weight of the coating.

3. The coated building panel according to claim 1, wherein the ionic dispersant is anionic.

4. The coated building panel according to claim 1, wherein the inorganic particle is present in an amount ranging from about 0.5 wt. % to about 10.0 wt. % based on the total weight of the surface coating.

5. The coated building panel according to claim 1, wherein the coating further comprises a polymeric binder present in an amount ranging from about 15 wt. % to about 35 wt. % based on the total weight of the coating.

6. The coated building panel according to claim 1, wherein the coating further comprises a pigment in an amount ranging from about 25 wt. % to about 55 wt. % based on the total weight of the surface coating, wherein the pigment comprises an inorganic particle selected from titanium dioxide, calcium carbonate, and particles exhibiting a color selected from red, blue, yellow, black, brown, violet, grey and combinations thereof.

7. The coated building panel according to claim 1, wherein the coating is present in an amount ranging from about 750 g/m² to about 1,500 g/m² and wherein the coating comprises a liquid carrier in an amount less than about 1 wt. % based on the total weight of the coating.

8. The coated building panel according to claim 1, wherein the body comprises inorganic fiber selected from mineral wool, fiberglass, rock wool, slag wool, and combinations thereof.

9. A coated building panel having a first major exposed surface opposite a second major exposed surface and a side exposed surface extending between the first and second major exposed surfaces, the coated building panel further comprising:
   a body comprising an upper surface opposite a lower surface and a side surface extending between the upper surface and the lower surface;
   a coating applied to the side surface of the body, the coating comprising:
     a first sub-layer applied directly to the side surface of the body; and
     a second sub-layer applied to the first sub-layer;
   wherein the first sub-layer and the second sub-layer each comprise a coating composition that includes kaolin having a disk shape, a non-ionic and aromatic wetting agent, and an ionic dispersant comprising at least two ionic groups;
   wherein the side exposed surface of the coated building panel is formed by the second sub-layer and wherein the coating has a thickness ranging from about 500 microns to about 1,200 microns; and
   wherein the wetting agent is tristyrylphenol ethoxylate.

10. The coated building panel according to claim 9, wherein the ionic dispersant is present in an amount ranging from about 0.05 wt. % to about 2.0 wt. % based on the total weight of the coating.

11. The coated building panel according to claim 9, wherein the ionic groups form at least a portion of a linear backbone of a polymer and the ionic group is anionic.

12. The coated building panel according to claim 9, wherein the coating further comprises a polymeric binder present in an amount ranging from about 15 wt. % to about 35 wt. % based on the total weight of the coating.

13. The coated building panel according to claim 9, wherein the coating further comprises a non-ionic wetting agent comprising at least one aromatic group.

14. The coated building panel according to claim 9, wherein the coating further comprises a pigment in an amount ranging from about 25 wt. % to about 55 wt. % based on the total weight of the surface coating.

15. The coated building panel according to claim 9, wherein the first sub-layer has a first thickness and the second sub-layer has a second thickness, wherein the first thickness and second thickness are not equal.

16. A coated building panel having a first major exposed surface opposite a second major exposed surface and a side exposed surface extending there-between, the coating building panel comprising:
   a body comprising an upper surface opposite a lower surface and a side surface extending between the upper surface and the lower surface, the body comprises inorganic fiber selected from mineral wool, fiberglass, rock wool, and slag wool;
   a coating having a first sub-layer applied directly to the side surface of the body and a second sub-layer applied to the first sub-layer; the coating applied to the side surface of the body in an amount ranging from about 750 g/m² to about 1,500 g/m², the coating formed of a composition comprising:
      a polymeric binder present in an amount ranging from about 15 wt. % to about 35 wt. % based on the total weight of the coating;
      an inorganic particle having a disk shape present in an amount ranging from about 0.5 wt. % to about 10.0 wt. % based on the total weight of the surface coating;
      an ionic dispersant comprising an anionic group present on a repeating unit that forms a linear backbone of a polymer, the ionic dispersant comprising at least two of the repeating units, and the ionic dispersant is present in an amount ranging from about 0.05 wt. % to about 2.0 wt. % based on the total weight of the coating;
      a pigment in an amount ranging from about 25 wt. % to about 55 wt. % based on the total weight of the surface coating;
      a non-ionic wetting agent comprising at least one aromatic group; and
      the coating having a liquid carrier in an amount less than about 1 wt. % based on the total weight of the coating;
   wherein the side exposed surface of the coated building panel is formed by the second sub-layer and wherein the coating has a thickness ranging from about 500 microns to about 1,200 microns;
   wherein the side exposed surface has a varied macroscopic texture; and
   wherein the wetting agent is tristyrylphenol ethoxylate.

17. The coated building panel according to claim 16, wherein the first sub-layer has a first thickness and the second sub-layer has a second thickness, wherein the first thickness and second thickness are not equal.

* * * * *